(12) United States Patent
Tugnolo et al.

(10) Patent No.: US 8,375,776 B2
(45) Date of Patent: Feb. 19, 2013

(54) METHOD FOR DETERMINING AN IN-CYLINDER PRESSURE CURVE OF A MULTI-CYLINDER ENGINE

(75) Inventors: Manuel Tugnolo, Callegno (IT);
Alessandro Catanese, Orbassano (IT);
Simone Barbero, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 313 days.

(21) Appl. No.: 12/905,822

(22) Filed: Oct. 15, 2010

(65) Prior Publication Data

US 2011/0088459 A1     Apr. 21, 2011

(30) Foreign Application Priority Data

Oct. 16, 2009   (GB) .................................. 0918207.2

(51) Int. Cl.
*G01M 15/08*     (2006.01)

(52) U.S. Cl. .................................................. 73/114.16

(58) Field of Classification Search ............... 73/114.16, 73/114.17, 114.22
See application file for complete search history.

(56) References Cited

U.S. PATENT DOCUMENTS

| | | | |
|---|---|---|---|
| 2001/0002587 A1 | 6/2001 | Walter et al. | |
| 2006/0293829 A1* | 12/2006 | Cornwell et al. | 701/114 |
| 2009/0038385 A1* | 2/2009 | Catanese et al. | 73/114.16 |
| 2009/0055074 A1* | 2/2009 | Ishiguro et al. | 701/102 |
| 2009/0158831 A1* | 6/2009 | Cornwell et al. | 73/114.16 |

FOREIGN PATENT DOCUMENTS

| | | |
|---|---|---|
| JP | 2007278098 A | 10/2007 |
| WO | 2004048761 A1 | 6/2004 |
| WO | 2009141199 A1 | 11/2009 |

OTHER PUBLICATIONS

British Patent Office, British Search Report for Application No. GB0918207.2, dated Feb. 26, 2010.

\* cited by examiner

*Primary Examiner* — Eric S McCall
(74) *Attorney, Agent, or Firm* — Ingrassia Fisher & Lorenz, P.C.

(57) ABSTRACT

A method is provided for determining an in-cylinder pressure curve representative of the evolution of the pressure within a cylinder of a multi-cylinder internal combustion engine. The method includes, but is not limited to setting a timeframe during the engine functioning, sampling pressure within at least two sensed cylinders of the engine, the samplings being performed during not contemporary sampling periods within the assumed timeframe, in order to acquire a partial in-cylinder pressure curve for each of the sensed cylinders, and using the partial in-cylinder pressure curves for reconstructing a whole in-cylinder pressure curve.

20 Claims, 6 Drawing Sheets

METHOD FOR DETERMINING AN IN-CYLINDER PRESSURE CURVE OF A MULTI-CYLINDER ENGINE

CROSS-REFERENCE TO RELATED APPLICATION

This application claims priority to British Patent Application No. 0918207.2, filed Oct. 16, 2009, which is incorporated herein by reference in its entirety.

TECHNICAL FIELD

The present invention relates to a method for determining an in-cylinder pressure curve of a multi-cylinder internal combustion engine, in particular of a Diesel engine.

BACKGROUND

It is known to control the injection of fuel in each cylinder of a Diesel engine using an open-loop control. In these conventional systems the injection time and the pulse width of the injections are selected from predefined values stored in the engine's electronic control unit (ECU), on the base of one or more engine characteristic parameters, such as for example engine speed, engine load, environ-mental temperature and pressure.

Although such systems exhibit acceptable performance, they show typical defects and drawbacks of open-loop control. For example, the flow characteristics of an injector in a Diesel engine may change during time as a result of aging phenomena, thus the pulse width used for the injector will no longer supply the cylinder with the desired quantity of fuel, and in general the performance of the engine will be degraded, giving way to higher polluting emissions, higher fuel consumption, increased noise and even the possibility of damage to the engine.

In order to improve such situation, recent Diesel engine systems provides a closed-loop control of a parameter representative of the fuel combustion in the engine cylinders, in order to stabilize the combustion and reduce polluting emission.

One of the mostly used parameter in controlling the combustion of a Diesel engine is the position of MFB50, which is the crank angle in which the 50% of mass of the fuel injected into the cylinder has been burnt.

The determination of said parameter requires the ECU to sample the pressure within the cylinder during an engine cycle, to thereby determining an in-cylinder pressure curve; to use said in-cylinder pressure curve for calculating a heat release curve over the same engine cycle; and finally to calculate the position of MFB50 on the base of said heat release curve.

The pressure is sampled by means of a pressure sensor set inside the cylinder and typically integrated in the glow plug associated to the cylinder itself; such pressure sensor being connected with the ECU via an analog/digital converter.

In order to achieve the best control accuracy, have been considered Diesel engine control systems configured for controlling the combustion in each cylinder of the engine, independently and contemporaneously.

As a matter of fact, such control systems require at least one pres-sure sensor per cylinder, one analog/digital converter per pressure sensor, and an ECU having an elevated throughput/computational capacity, to thereby contemporaneously sampling the in-cylinder pressure curve of each cylinder. One serious drawback of such control systems is therefore the high cost of the electronic components, in particular of pressure sensors, analog/digital converters and ECU.

In order to reduce total cost, Diesel engine control systems have been configured for using one pressure sensor only, in order to sample the pressure within a single "lead cylinder" of the engine, and for applying information derived from such pressure sensor to control also the cylinders without pressure sensor. As a matter of fact, this second approach gives way to a closed-loop control of "lead cylinder" with pressure sensors and subordinated open-loop control of non-sensed cylinders depending on "lead cylinder". This second approach is performed under the assumption that the pres-sure curves are substantially identical across the different cylinders.

However, has been shown that in a Diesel engine there may be one or more cylinders in which the combustion takes place in different way than in the other cylinders, resulting in different in-cylinder pres-sure curve. Such different behavior can depend for example on the geometry of the intake manifold, whose design can be such that, under certain engine operating conditions, one or more cylinders receive different quantities of EGR.

It follows that the in-cylinder pressure curve sampled in a single cylinder is not always properly representative of the combustion in the other cylinders, and consequently that the control of non-sensed cylinders has a limited quality, leading to increased fuel consumption, polluting emission, etc.

At least one object of the present invention is to provide an in-cylinder pres-sure curve which takes into account more than one cylinder, in order to be suitable for performing a closed-loop control having better quality than that based on the in-cylinder pressure curve sampled in a single cylinder. At least another object of the present invention is to provide an in-cylinder pressure curve whose determination requires reduced hardware re-sources and involves reduced throughput and/or computational load for the ECU than that necessary for sampling the in-cylinder pressure curve in each cylinder, to thereby reducing the total cost of the engine system. In addition, other objects, desirable features, and characteristics will become apparent from the subsequent summary and detailed description, and the appended claims, taken in conjunction with the accompanying drawings and this background.

SUMMARY

A method is provided for determining an in-cylinder pressure curve representative of the evolution of the pressure within a cylinder of a multi-cylinder internal combustion engine. The method comprises the steps of setting a timeframe during the engine functioning, sampling pressure within at least two sensed cylinders of the engine, the samplings being performed during not contemporary sampling periods within said assumed timeframe, in order to acquire a partial in-cylinder pressure curve for each of said sensed cylinders, using said partial in-cylinder pressure curves for reconstructing a whole in-cylinder pressure curve. Since the method involves pressure information sampled in more than one cylinder, it provides a reconstructed in-cylinder pressure curve which is generally more reliable than that sampled in a single cylinder.

According to an embodiment of the invention, the method provides for cyclically repeating the phases during the engine functioning, in order to cyclically obtain a reconstructed in-cylinder pressure curve representative of the actual engine behavior. Such reconstructed in-cylinder pressure curves can be used for calculating a combustion characteristic parameter, such as for example the position of MFB50, suitable for performing a quality closed-loop control of the combustion. The reconstructed in-cylinder pressure curves can also be used for other purpose, such as for example for estimating the intake manifold pressure, for estimating the exhaust manifold pressure, for estimating the indicated mean effective pressure (IMEP), for estimating the pumping mean effective pressure (PMPE), or for estimating the indicated torque.

According to an embodiment of the invention, the pressure within each sensed cylinder can be sampled by means of the ECU via a pressure sensor which is set into the cylinder, eventually integrated in the glow plug associated to the cylinder itself. Since the sampling period are not contemporary, all pressure sensors can be connected with the ECU via a single analog/digital converter, and besides the ECU is subject to reduced throughput/computational load compared with the solutions which provide for sampling pressure in all cylinders contemporaneously, to thereby obtaining a cheaper engine system.

In the contest of the present invention, the assumed timeframe and the sampling periods within the timeframe are defined in terms of angular position of the crankshaft, so that they are independent from engine speed. In particular, each sampling period is defined by the following characteristic parameters: period width, period opening and period closing.

According to an embodiment of the present invention, each sampling period involved in the method can be adjusted independently from the others, for example by varying one or more of its characteristic parameters. Preferably, each sampling period can be adjusted in function of the actual engine operating point, i.e. on the base of one or more actual engine operating parameters, such as for example engine speed and engine load. Therefore, it is possible to have different sampling periods for each sampled cylinder and for each engine operating point.

According to an embodiment of the invention, the sampling periods within the assumed timeframe are chosen so that the acquired partial in-cylinder pressure curves are individually representative of different stages of an engine cycle. In this case, the reconstruction of the whole in-cylinder pressure curve preferably provides for adopting each acquired partial in-cylinder pressure curve as the portion of the reconstructed in-cylinder pressure curve which represents the corresponding stage of the engine cycle.

According to another embodiment of the invention, the sampling periods within the assumed timeframe are chosen so that at least two acquired partial in-cylinder pressure curves comprise respective over-lapping portion and non overlapping portion, wherein the overlapping portions are representative of a same common stage of an engine cycle, and non overlapping portions are representative of different stages of an engine cycle. In this case, the reconstruction of the whole in-cylinder pressure curve preferably provides for adopting each non overlapping portion as the portion of the reconstructed in-cylinder pressure curve for the corresponding stage of the engine cycle, and for processing together the overlapping portions in order to calculate the portion of the reconstructed in-cylinder pressure curve which represents the common stage.

The method according to an embodiment of the invention can be realized in the form of a computer program comprising a program-code to carry out all the steps of the method of the invention and in the form of a computer program product comprising means for executing the computer program.

The computer program product comprises, according to a preferred embodiment of the invention, a control apparatus for a multi-cylinder internal combustion engine having a microprocessor based controller, for example the ECU of the engine, in which the program is stored so that the control apparatus in the same way as the method. In this case, when the microprocessor based controller executes the computer program, the steps of the method according to the invention are carried out.

The method according can be also realized in the form of an electromagnetic signal, said signal being modulated to carry a sequence of data bits which represent a computer program to carry out all steps of the method.

BRIEF DESCRIPTION OF THE DRAWINGS

The present invention will hereinafter be described in conjunction with the following drawing figures, wherein like numerals denote like elements, and.

DETAILED DESCRIPTION

Figure 1:
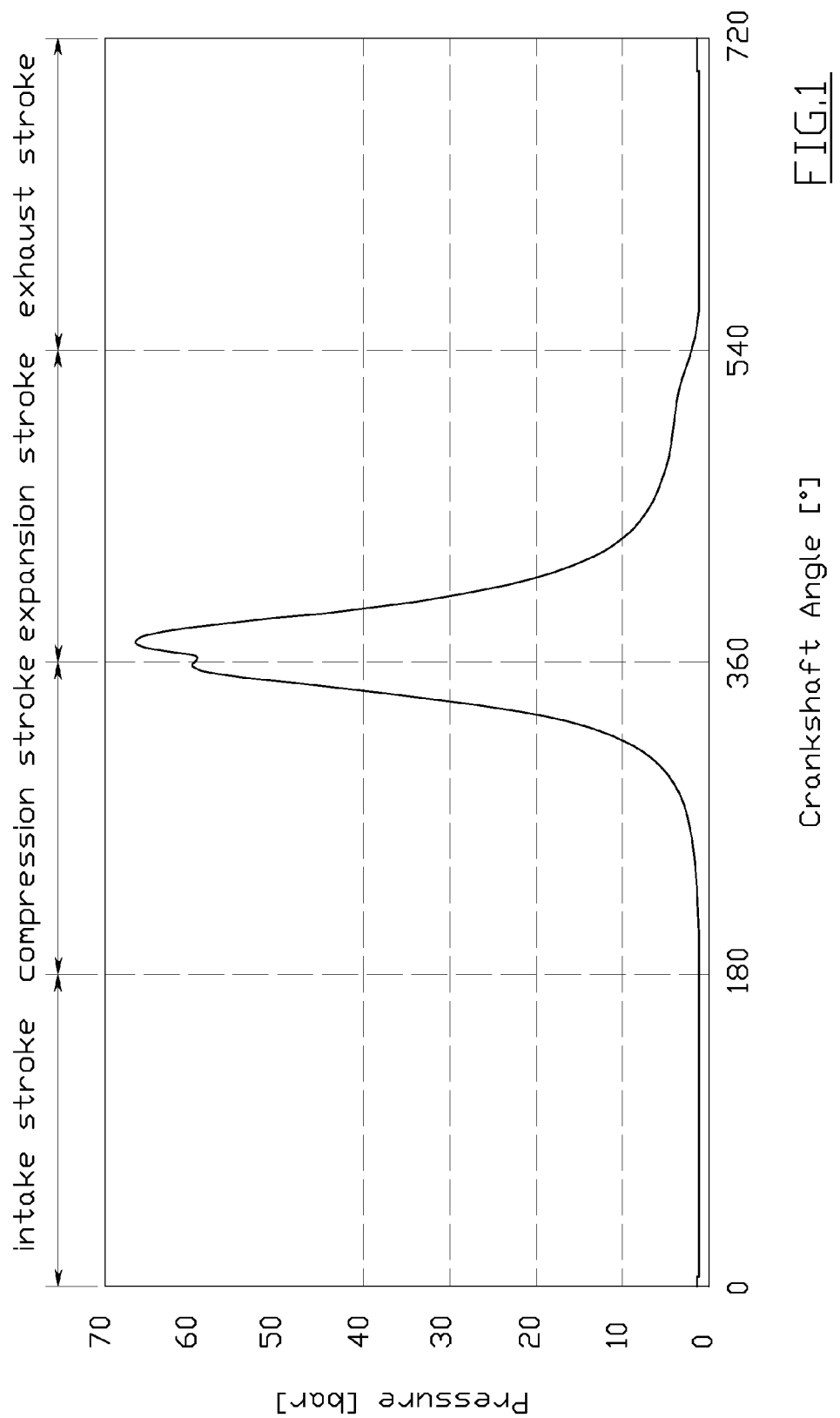
FIG. 1 shows a pressure/crank-angle diagram, which represents a theoretical in-cylinder pressure curve within a cylinder of an internal combustion engine during an engine cycle.

The following detailed description is merely exemplary in nature and is not intended to limit the invention or the application and uses of the invention. Furthermore, there is no intention to be bound by any theory presented in the preceding background or summary of the following detailed description.

The Diesel engine comprises four cylinders, each of which accommodates a reciprocating piston defining a combustion chamber therein. The pistons are mechanically connected with a crankshaft by means of respective connecting rods, to thereby transforming the reciprocating movements of the pistons in a rotation of the crankshaft. The cylinders are individually provided with one or more intake valves for cyclically open the combustion chamber towards an engine intake manifold; with one or more exhaust valves for cyclically open the combustion chamber towards an engine exhaust manifold; and with an electronically controlled injector for injecting fuel into the combustion chamber.

The Diesel engine is configured so that each piston performs an engine cycle during two crankshaft rotations (approximately 720°), which correspond to four strokes of the piston itself into the corresponding cylinder: intake stroke, compression stroke, expansion stroke and exhaust stroke.

During the intake stroke, the intake valve(s) are open, the exhaust valve(s) are closed, and the piston descends from top dead center (TDC), which is the position where the piston is nearest the top of the cylinder, to the bottom dead center (BDC), which is the position where the piston is farthest the top of the cylinder, to thereby aspiring an air mass from the intake manifold into the combustion chamber. Such air mass can eventually contain an appropriate amount of exhaust gas, which is channeled from the exhaust manifold into the intake manifold via an EGR system.

During the subsequent compression stroke, the intake valve(s) close and the piston rises from its bottom dead center (BDC) to top dead center (TDC), to thereby compressing the air mass into the combustion chamber. At the final stage of the compression stroke, the injector injects fuel directly into the combustion chamber, typically according to a multi-injection pattern. The injections continue across the top dead center (TDC) of the piston, so that the injected fuel burns quite completely inside the combustion chamber.

The combustion of the fuel produces high temperature and pressure gases, whose expansion directly apply force to the piston for pushing it through the expansion stroke towards its bottom dead center (BDC), in order to generate torque at the crankshaft. When the piston is near the bottom dead center, the exhaust valve(s) open. During subsequent exhaust stroke, the piston rises from the bottom dead center to the top dead center, discharging exhaust gas from the combustion chamber through the exhaust valves and into the exhaust manifold. At the final stage of the exhaust stroke, the exhaust valve(s) close and than the four-stroke engine cycle starts again.

From the above, it follows that during each engine cycle the pressure within a cylinder (i.e. within a combustion chamber) varies according to a characteristic in-cylinder pressure curve, which is shown in FIG. 1. As a matter of fact, the in-cylinder pressure remain substantially constant at a low value during the whole intake stroke; rises rapidly during the compression stroke, after the closing of intake valve(s) (IVC); has a peak across the top dead center position of the piston, due to fuel combustion in the combustion chamber; decrease rapidly during the expansion stroke and, after the opening of exhaust valve(s) (EVO), remain substantially constant at a low value during the whole exhaust stroke.

This in-cylinder pressure curve recurs cyclically every two crank-shaft rotations (approximately 720°), maintaining substantially the same trend but varying in response to variations of engine operating parameters, such as for example engine speed, engine load, start of injection, EGR ratio, etc. The Diesel engine is configured so that the combustions across the different cylinders occur consecutively, but occurs in sequence ac-cording to a predetermined firing order and separated by a constant crank angle. It follows that the in-cylinder pressure curves representative of the engine cycles performed by the individual pistons are shifted by 180° out of phase from each other, with reference to the angular position of the crankshaft.

Figure 2:
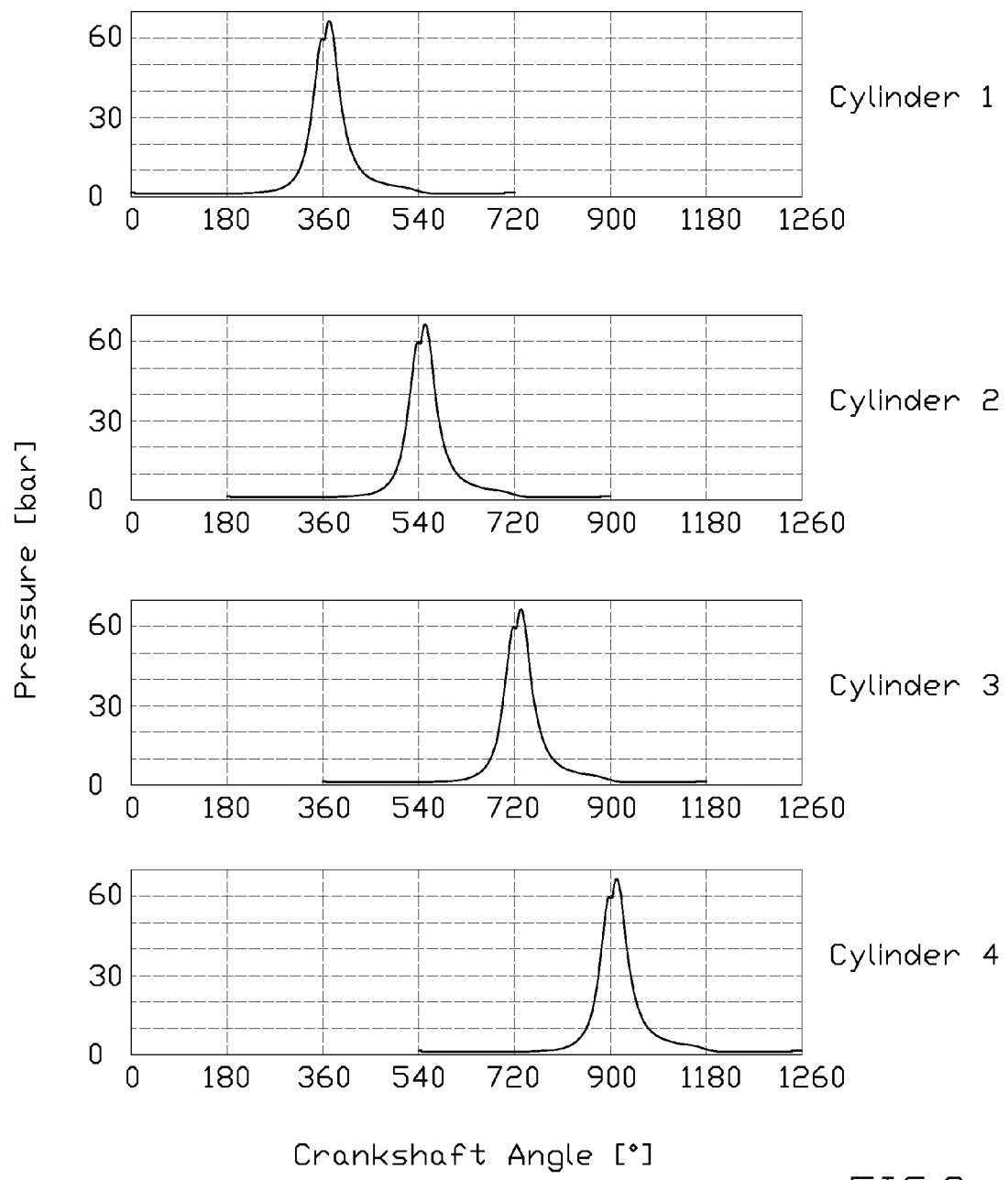
FIG. 2 shows four pressure/crank-angle diagrams, each of which represents the theoretical in-cylinder pressure curves of a respective cylinder of a four-cylinder internal combustion engine during 720° of rotation of the crankshaft.

The theoretical in-cylinder pressure curves of the Diesel engine are shown in FIG. 2, wherein the cylinders are numbered 1-4 according to their firing order. For representation purpose, FIG. 2 shows angular windows from crankshaft angles between approximately 0° and approximately 1260°, wherein 0° indicates the beginning of the intake stroke in the first cylinder 1 and 1260° indicates the end of the exhaust stroke in the last cylinder 4.

The present invention provides a method for determining an actual in-cylinder pressure curve, which represents the evolution of the pressure within a cylinder of the Diesel engine during an engine cycle. According to a first embodiment of the invention, the method provides to equip each cylinders of the engine with a dedicated pressure sensor, which is set inside the cylinder itself, in order to directly measure the pressure therein.

Figure 3:
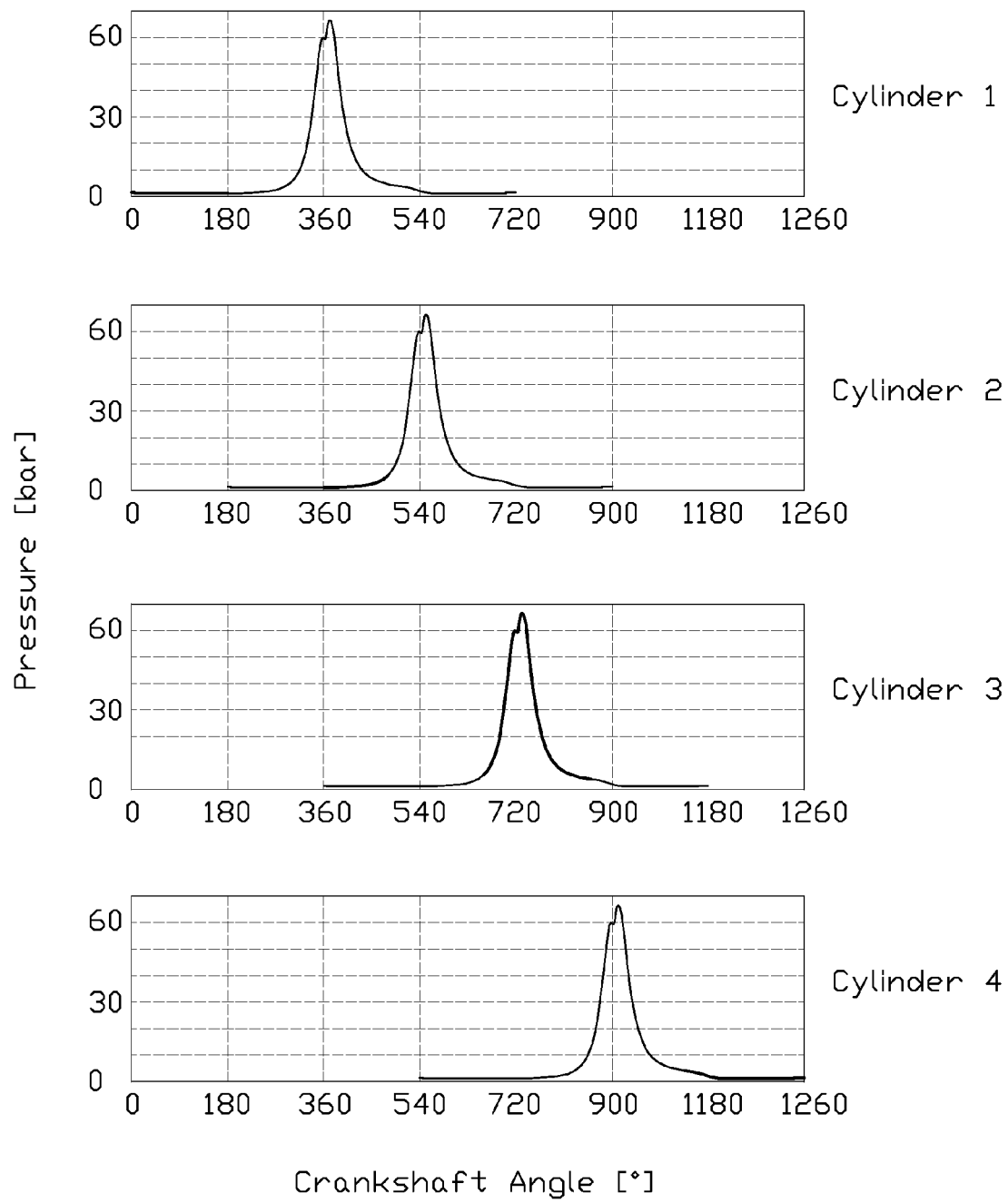
FIG. 3 reproduces the diagrams of FIG. 2 for illustrating the initial phase of a method according to a first embodiment of the present invention.

As shown in FIG. 3, the method is performed during the engine functioning and provides for considering a timeframe corresponding to 1260° of rotation of the crankshaft. Referring to FIG. 3, the timeframe considered in the present embodiment of the invention comprises the whole angular windows between approximately 0° and approximately 1260°.

During said timeframe, the method provides for sampling the in-cylinder pressure in all cylinders of the engine, wherein the samplings are performed during consecutive sampling periods within the timeframe, in order to acquire a partial in-cylinder pressure curve for each cylinder (indicated by the bold portion of the respective pressure curve in FIG. 3).

According to the present embodiment, the sampling periods within the assumed timeframe are chosen so that the acquired partial in-cylinder pressure curves are individually representative of different stages of an engine cycle As a matter of fact, the method provides for sampling the in-cylinder pressure of the first cylinder 1 during a sampling period comprised approximately between 0° and 180° of rotation of crankshaft, in order to acquire a partial in-cylinder pressure curve representative of the intake stroke of the piston within the first cylinder 1. Afterwards, the method provides for sampling the in-cylinder pressure of the second cylinder 2 during a sampling period comprised approximately between approximately 360° and approximately 480° of rotation of crankshaft, in order to acquire a partial in-cylinder pressure curve representative of the beginning of the compression stroke of piston within the second cylinder 2. After-wards, the method provides for sampling the in-cylinder pressure of the third cylinder 3 during a sampling period comprised approximately between approximately 660° and approximately 860° of rotation of crankshaft, in order to acquire a partial in-cylinder pressure representative of the end of the compression stroke, fuel combustion and of the beginning of the expansion stroke of the piston within the third cylinder 3. Finally, the method provides for sampling the in-cylinder pressure of the fourth cylinder 4 during a sampling period comprised approximately between approximately 1040° and approximately 1260° of rotation of crankshaft, in order to acquire a partial in-cylinder pressure curve representative of the end of the expansion stroke and the whole exhaust stroke of piston within the fourth cylinder 4. These sampling periods are obviously given by way of example only and not of limitation.

According to the invention, these sampling periods can be adjusted independently from each others by varying one or more of their individual characteristic parameters, such for example period width, period opening and period closing, eventually on the base of the actual engine operating point, i.e., on the base of one or more actual engine operating parameters, such as for example engine speed and engine load.

The method according the present embodiment of the invention has the sampling periods within the assumed timeframe are consecutive, and preferably that the sum of such sampling periods corresponds to approximately 720° of rotation of the crankshaft. Having the partial in-cylinder pressure curves sampled in the individual cylinders, the method provides for using them in order to re-construct an in-cylinder pressure curve representative of a single engine cycle.

Figure 4:
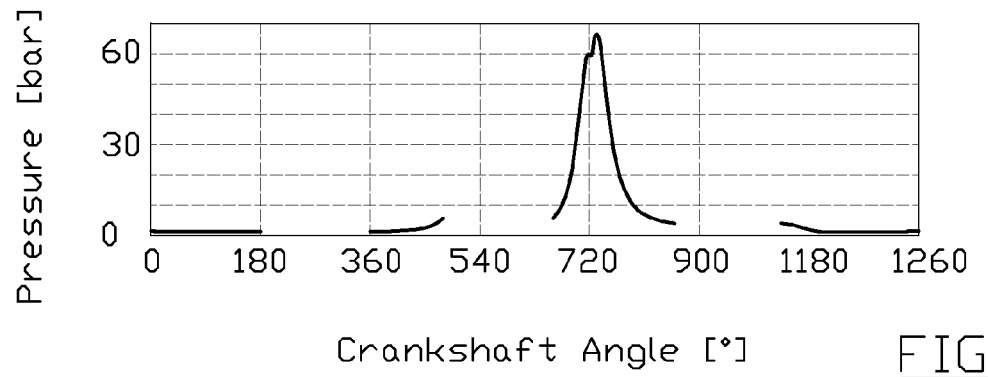
FIG. 4 shows a pressure/crank-angle diagram for illustrating a subsequent phase of the method according to the first embodiment of the present invention.
Figure 5:
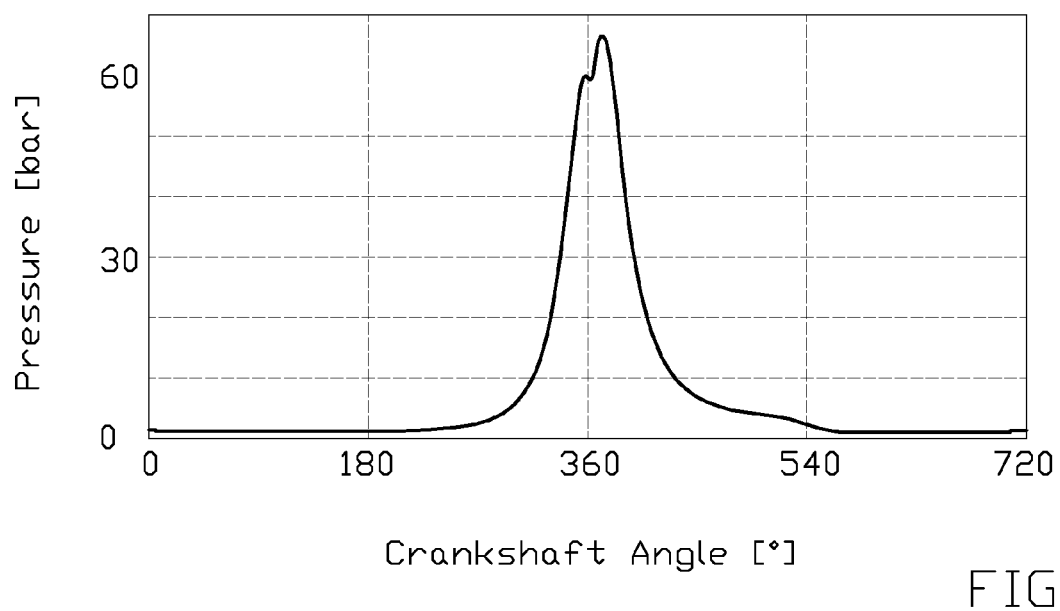
FIG. 5 shows a pressure/crank-angle diagram, which illustrates the reconstructed in-cylinder pressure curve provided by the method according to the first embodiment of the present invention.

As shown in FIG. 4 and FIG. 5, the method according to the present embodiment provides for disregarding the periods in which no pressure has been measured, and provides for consecutively joining the partial in-cylinder pressure curves sampled in the different cylinders, in order to achieve a whole in-cylinder pressure curve over approximately 720° of rotation of the crankshaft, that is the length of an engine cycle.

In greater detail, the method provides for adopting each acquired partial in-cylinder pressure curve as the portion of the reconstructed in-cylinder pressure curve which represents the corresponding stage of an engine cycle.

The phases of the method according the present embodiment can be repeated for a subsequent timeframe of approximately 1260°, and so on, in order to cyclically obtain a reconstructed in-cylinder pressure curve representative of the actual engine behavior. During each subsequent timeframe, the pressure sensor associated to the last sampled cylinder of the preceding timeframe (i.e., the cylinder 4 in FIG. 3) will be used for first, for example for sampling a partial in-cylinder pressure curve representative of the intake stroke; the pressure sensor associated to the first sampled cylinder of the preceding timeframe (i.e., the first cylinder 1 in FIG. 3) will be used for second, for example for sampling a partial in-cylinder pres-sure curve representative of the beginning of compression stroke; the pressure sensor associated to the second sampled cylinder of the pre-ceding timeframe (i.e., the second cylinder 2 in FIG. 3) will be used for third, for example for sampling a partial in-cylinder pressure curve representative of the end of compression stroke, fuel combustion and the beginning of expansion stroke; and finally the pressure sensor associated to the third sampled cylinder of the preceding timeframe (i.e., the cylinder 3 in FIG. 3) will be used for forth, for example for sampling a partial in-cylinder pressure curve representative of the end of expansion stroke and of the whole exhaust stroke.

Figure 6:
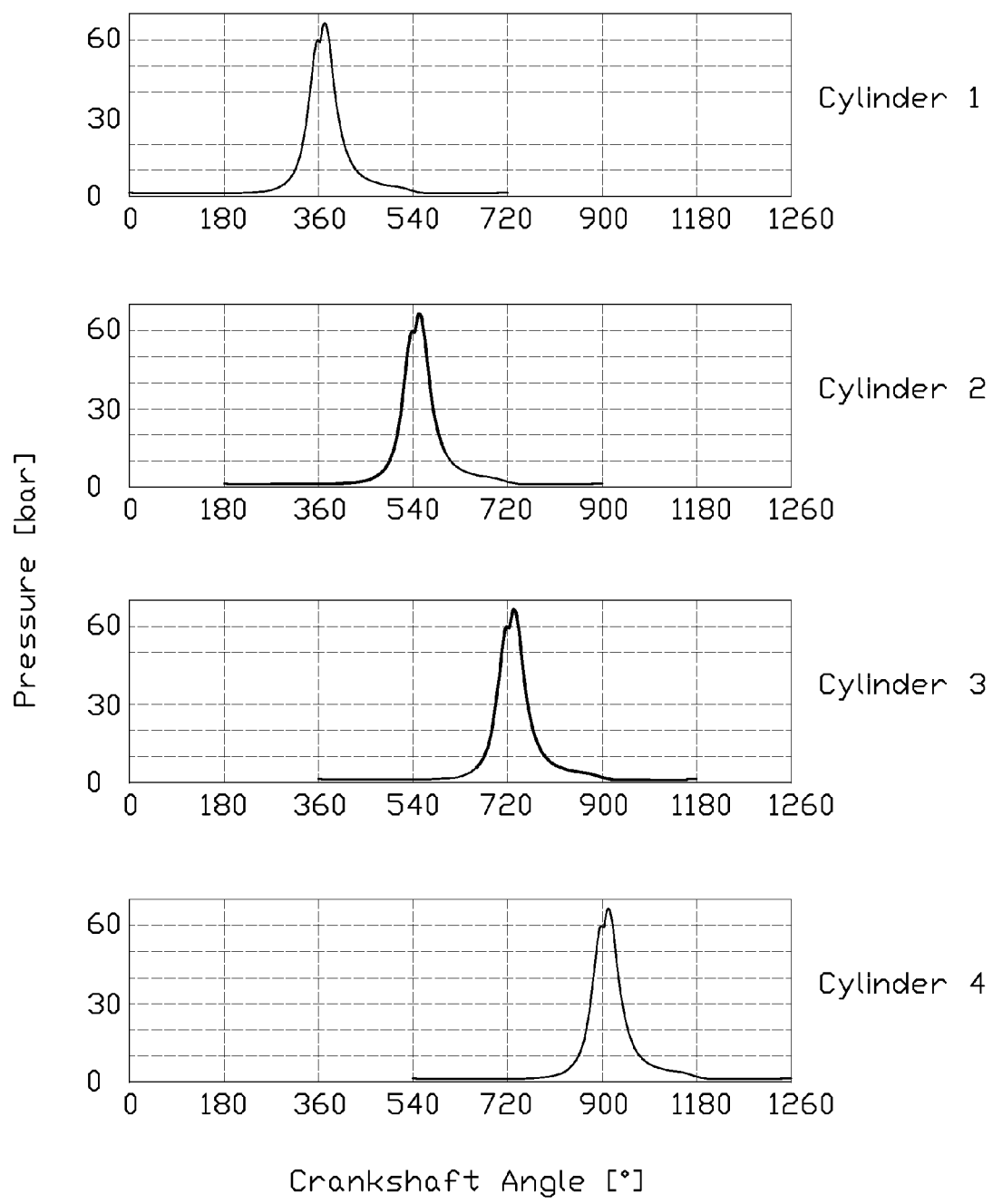
FIG. 6 reproduces the diagrams of FIG. 2 for illustrating the initial phase of a method according to a second embodiment of the present invention.

According to a second embodiment of the invention, the method provides to equip only two cylinders with a dedicated pressure sensor. Referring to FIG. 6, such pressure sensors are set inside the cylinder 2 and 3 which are consecutive in firing order.

The method according the present embodiment is performed during the engine functioning, and provides for considering a timeframe corresponding to approximately 720° of rotation of the crankshaft, that is the length of an engine cycle.

Referring to FIG. 6, the timeframe considered is comprised approximately between 270° and 990°, wherein 270° indicates the middle point of the intake stroke of the piston within the second cylinder 2, and 990° indicates the middle point of the exhaust stroke of the piston within the third cylinder 3.

During the assumed timeframe, the method provides for sampling the in-cylinder pressure of the cylinders 2 and 3, wherein the samplings are performed during not contemporary sampling periods within the timeframe, in order to acquire a partial in-cylinder pressure curve for each sampled cylinder (represented by bold portion of the corresponding pressure curve in FIG. 6).

As a matter of fact, the method provides for sampling the in-cylinder pressure of the cylinder 2 during a sampling period comprised approximately between 270° and 600° of rotation of crankshaft, in order to acquire a partial in-cylinder pressure curve representative of half intake stroke, compression stroke, fuel combustion and the beginning of the expansion stroke of the piston within the cylinder 2. Afterwards, the method provides for sampling the in-cylinder pressure of the cylinder 3 during a sampling period comprised approximately between 660° and 990° of rotation of crankshaft, in order to acquire a partial in-cylinder pressure curve representative of the end of the compression stroke, fuel combustion, expansion stroke and half of exhaust stroke of piston within the cylinder 3.

Figure 7:
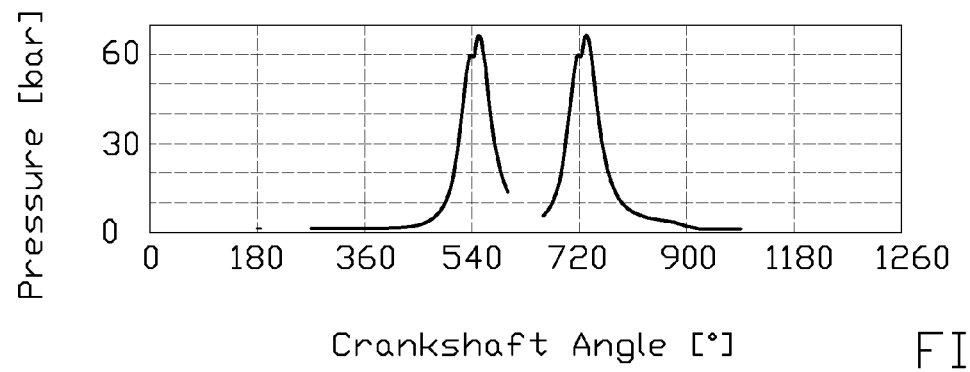
FIG. 7 shows a pressure/crank-angle diagram for illustrating a subsequent phase of the method according to the second embodiment of the present invention.
Figure 8:
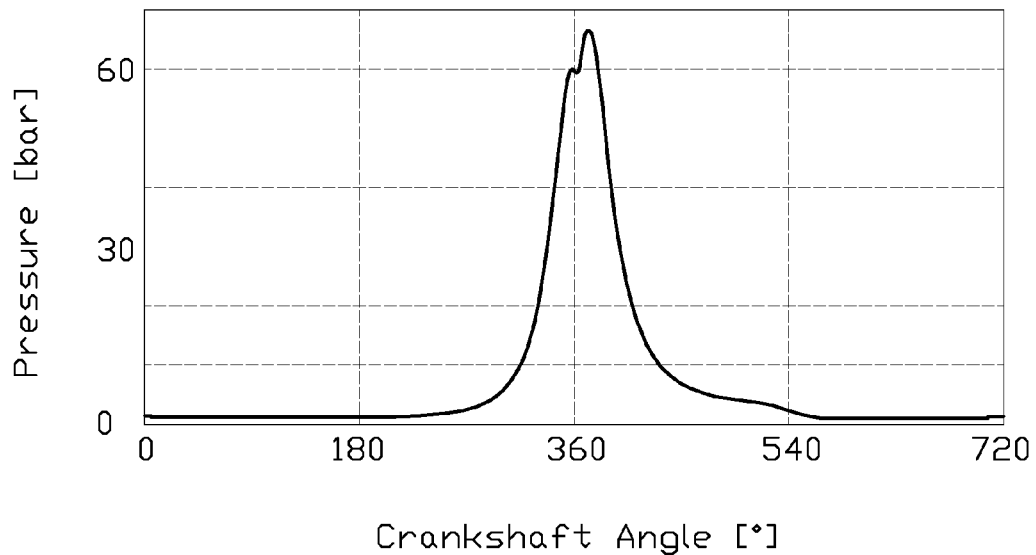
FIG. 8 shows a pressure/crank-angle diagram, which illustrates the reconstructed in-cylinder pressure curve provided by the method according to the second embodiment of the present invention.

Therefore, the partial in-cylinder pressure curves sampled in cylinder 2 and 3 comprise respective non overlapping portions, which rep-resent different stages of an engine cycle, and respective overlap-ping portions, which represent a same stage of an engine cycle, i.e., the end of compression stroke, fuel combustion and the beginning of expansion stroke (see FIG. 7). These sampling periods previously disclose are given by way of example only and not of limitation.

According to an embodiment of the invention, such sampling periods can be adjusted in-dependently from each others by varying one or more of their individual characteristic parameters, such for example period width, period opening and period closing, eventually on the base of the actual engine operating point, i.e., on the base of one or more actual engine operating parameters, such as for example engine speed and engine load. The method according to the present embodiment of the invention only provides that the sampling periods are not contemporary.

Having the partial in-cylinder pressure curves sampled in the cylinders 2 and 3, the method provides for using them in order to reconstruct an in-cylinder pressure curve representative of a single engine cycle.

According to the present embodiment of the invention, the initial portion of the reconstructed in-cylinder pressure curve, corresponding approximately to the last half of intake stroke and the beginning of compression stroke, is assumed to be the non overlapping portion of the partial in-cylinder pressure curve of cylinder 2; the final portion of the reconstructed in-cylinder pressure curve, corresponding approximately to the end of expansion stroke and first half of exhaust stroke, is assumed to be the non overlapping portion of the partial in-cylinder pressure curve of cylinder 3; while the central portion of the reconstructed in-cylinder pressure curve, corresponding approximately to the end of compression stroke, fuel combustion and the beginning of expansion stroke, is calculated on the base of both the overlapping portions of the partial in-cylinder pressure curves of cylinder 2 and 3.

For example, each point of the central portion of the reconstructed in-cylinder pressure curve can be calculated as an average value between the corresponding points of the overlapping portion of the partial in-cylinder pressure curves of cylinder 2 and 3.

This approach is based on the following factual remarks: the low value in-cylinder pressure during the intake stroke, the beginning of compression stroke, the end of expansion stroke and the exhaust stroke, is effectively quite the same for each engine cylinder, the high value in-cylinder pressure during the end of compression stroke, fuel combustion and the beginning of expansion stroke, is generally influenced by so many factors, including for example EGR rate, that it can be effectively quite different from one cylinder to another.

Therefore, while the initial and final portions of the in-cylinder pressure curve can be efficiently reconstructed on the base of pres-sure sampling performed in single a cylinder, the central portion of the in-cylinder pressure curve is more effective if it is reconstructed on the base of the samplings performed in more than one cylinder. The in-cylinder pressure curve so reconstructed lacks of the portions corresponding to the first half of the intake stroke, and of the last half of the exhaust stroke. However it is well known that the in-cylinder pressure during the in-take stroke and exhaust stroke remains substantially constant at a low value. Therefore, according to the present embodiment of the invention, the reconstructed in-cylinder pressure curve in the first half of the in-take stroke is assumed to be a straight horizontal line having the value of the first point of the partial in-cylinder pressure curve of cylinder 2, and reconstructed in-cylinder pressure curve in the second half of the exhaust stroke is assumed to be a straight horizontal line having the value of the last point of the partial in-cylinder pressure curve of cylinder 3.

The method according the present embodiment of the invention can be repeated considering the subsequent timeframe of approximately 720° of rotation of the crankshaft, and so on, in order to cyclically obtain an in-cylinder pressure curve representative of the actual engine behavior. While the second embodiment has been disclosed measuring pressure within two cylinder consecutive in firing order, the method of the invention can be performed also measuring pressure in two cylinder non consecutive in firing order.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method for determining an in-cylinder pressure curve representative of an evolution of a pressure within a cylinder of a multi-cylinder internal combustion engine, the method comprising:
    setting a timeframe during functioning of the multi-cylinder internal combustion engine;
    sampling pressure within at least two sensed cylinders of the multi-cylinder internal combustion engine, the samplings performed in substantially consecutive time periods within the timeframe in order to acquire a partial in-cylinder pressure curve for each of said at least two sensed cylinders; and
    using said partial in-cylinder pressure curve for each of said at least two sensed cylinders for reconstructing a whole in-cylinder pressure curve.

2. The method according to claim 1, further comprising adjusting each sampling period independently from other sampling periods.

3. The method according to claim 2, wherein said adjusting provides for varying at least one of period width, period opening, or period closing.

4. The method according to claim 1, wherein each sampling period can be adjusted based on one or more engine operating parameters.

5. The method according to claim 4, wherein said one or more engine operating parameters are chosen in a group of an engine speed and an engine load.

6. The method according to claim 1, wherein the sampling periods within the timeframe are chosen so that the partial in-cylinder pressure curve for each of said at least two sensed cylinders are individually representative of different stages of an engine cycle.

7. The method according to claim 6, wherein the reconstruction of the whole in-cylinder pressure curve provides for adopting each acquired partial in-cylinder pressure curve as portion of the reconstructed in-cylinder pressure curve which represents a corresponding stage of the engine cycle.

8. The method according to claim 1, wherein the sampling periods within the timeframe are chosen so that at least two acquired partial in-cylinder pressure curves comprise overlapping portions and non overlapping portions, wherein said over-lapping portions are representative of a same common stage of an engine cycle, and said non overlapping portions are representative of different stages of the engine cycle.

9. The method according to claim 8, wherein the reconstruction of the whole in-cylinder pressure curve provides for adopting each non overlapping portion as a portion of the reconstructed in-cylinder pressure curve which represents a corresponding stage of the engine cycle, and for processing together the overlapping portions in order to calculate the portion of the reconstructed in-cylinder pressure curve that represents the common stage.

10. The method according to claim 1, wherein the method provides for cyclically repeating the steps during the functioning.

11. A computer readable medium embodying a computer program product, said computer program product comprising:
    a program for determining an in-cylinder pressure curve representative of an evolution of a pressure within a cylinder of a multi-cylinder internal combustion engine, the program configured to:
    set a timeframe during the functioning;
    sample pressure within at least two sensed cylinders of the multi-cylinder internal combustion engine, the samplings performed in substantially consecutive time periods within the timeframe in order to acquire a partial in-cylinder pressure curve for each of said at least two sensed cylinders; and
    use said partial in-cylinder pressure curve for each of said at least two sensed cylinders for reconstructing a whole in-cylinder pressure curve.

12. The computer readable medium according to claim 11, the program further configured to adjust each sampling period independently from other sampling periods.

13. The computer readable medium according to claim 12, wherein said adjusting of each sampling period varies at least one of period width, period opening, or period closing.

14. The computer readable medium according to claim 11, wherein each sampling period can be adjusted based on one or more engine operating parameters.

15. The computer readable medium according to claim 14, wherein said one or more engine operating parameters are chosen in a group of an engine speed and an engine load.

16. The computer readable medium according to claim 11, wherein the sampling periods within the timeframe are chosen so that the partial in-cylinder pressure curve for each of said at least two sensed cylinders are individually representative of different stages of an engine cycle.

17. The computer readable medium according to claim 16, wherein the reconstruction of the whole in-cylinder pressure curve provides for adopting each acquired partial in-cylinder pressure curve as a portion of the reconstructed in-cylinder pressure curve which represents a corresponding stage of the engine cycle.

18. The computer readable medium according to claim 11, wherein the sampling periods within the timeframe are chosen so that at least two acquired partial in-cylinder pressure curves comprise overlapping portions and a non overlapping portions, wherein said over-lapping portions are representative of a same common stage of an engine cycle, and said non overlapping portion are representative of different stages of the engine cycle.

19. The computer readable medium according to claim 18, wherein the reconstruction of the whole in-cylinder pressure curve provides for adopting each non overlapping portion as a portion of the reconstructed in-cylinder pressure curve which represents a corresponding stage of the engine cycle, and for processing together the overlapping portions in order to calculate the portion of the reconstructed in-cylinder pressure curve that represents the common stage.

20. The computer readable medium according to claim 11, wherein the program is configured to provide for cyclically repeating the steps during the functioning.

* * * * *